(No Model.)  2 Sheets—Sheet 1.
W. S. DEHART.
BRAKE SHOE.
No. 561,972. Patented June 16, 1896.
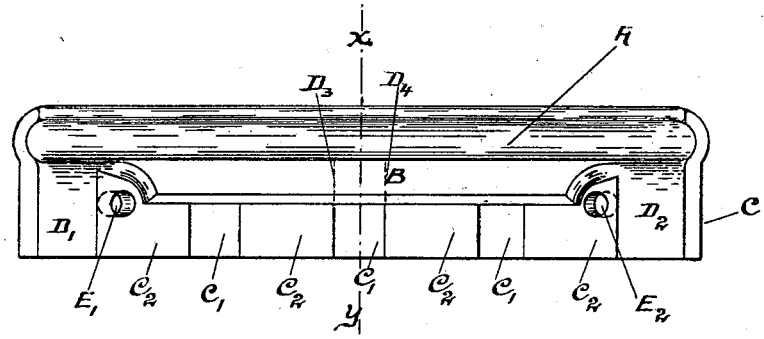
Fig. 1.
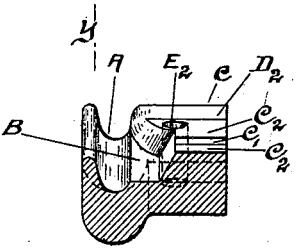
Fig. 2.
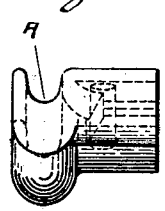
Fig. 3.
Fig. 4.
— Section on line x–y —
Witnesses
Charles W Brower
Alfred B Van Liew
Inventor
Winfield S Dehart (No Model.)  2 Sheets—Sheet 2.

W. S. DEHART.
BRAKE SHOE.

No. 561,972.  Patented June 16, 1896.

Witnesses—
Charles W. Brower
Alfred B. Van Liew

Inventor—
Winfield S. Dehart

UNITED STATES PATENT OFFICE.

WINFIELD S. DEHART, OF BLOOMFIELD, NEW JERSEY.

BRAKE-SHOE.

SPECIFICATION forming part of Letters Patent No. 561,972, dated June 16, 1896.

Application filed February 6, 1896. Serial No. 578,188. (No model.)

*To all whom it may concern:*

Be it known that I, WINFIELD S. DEHART, a citizen of the United States, residing at Bloomfield, in the county of Essex and State of New Jersey, have invented certain new and useful Improvements in Brake-Shoes; and I do hereby declare the following to be a full, clear, and exact description of the invention, such as will enable others skilled in the art to which it appertains to make and use the same.

The object of this invention is to obviate the unequal wearing of the tire of the car-wheel by the rail and the brake-shoe, or, in other words, to equalize the wear of the rail and the brake-shoe on all parts of the tire of the wheel, so that the conjoint action of the rail and the shoe upon the tire will result in keeping the face of the tire continually true or even, thereby doing away with the necessity of sending the tires to the shop frequently to be turned up on a lathe.

Figure 5:
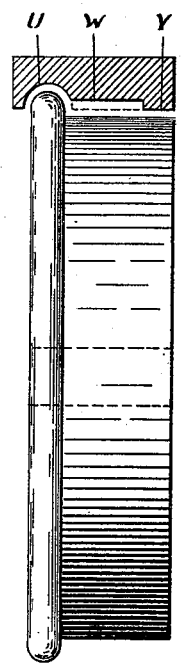
Figure 6:
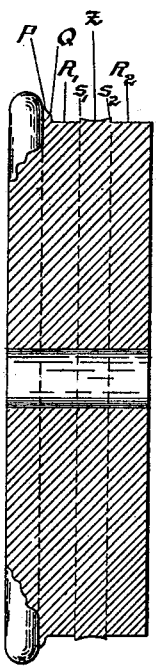

The style of brake-shoe to which this invention is particularly applicable is what is known as a "flanged" brake-shoe, having on one or both sides flanges adapted to project over the edge of the tire of the wheel. It is well known that when this style of shoe is used the shoe has practically no lateral motion upon the tire, and therefore the wear of the shoe on the tire is continuously in the same place, and no truing action is obtained by the shifting of the shoe in use from side to side of the tire, as is the case, more or less, when unflanged or plain brake-shoes are used. It is therefore especially necessary, when flanged shoes are used, that the shoe be so constructed that the wear of the shoe and the rail on the tire will balance each other. Many efforts have been made to attain this result, the principal ones being that shown by Steel in his English Patent No. 1,763 of 1875, and that shown by Ross in his United States Patent No. 292,861. In the Steel shoe a bearing-surface is given to the brake-shoe adapted to engage the tire of the wheel on that part of its face farthest removed from the flange of the tire and also to engage the flange itself, and all of the face of the shoe between these points is cut away or recessed, so as to have no bearing-surface on the tire at the recessed portion, the two bearing-surfaces and the recessed portion of the Steel shoe being shown at points U, Y, and W in Figure 5. The defect in this form of shoe was found to be in practice that the wear of the rail on the face of the tire not coming up close to the base of the flange on the tire resulted in the formation of a shoulder on the tread or face of the tire at the base of the flange, as shown at Q in Fig. 6. The wear of the shoe on the flange also aided in forming this shoulder by its cutting action on the flange, as shown at P in Fig. 6. To obviate this defect and cause a more even wear of the tread or face of the tire, Ross made a change or modification of the Steel shoe by bringing down a lug or projection from the face of the shoe, adapted to engage the tread of the wheel at the base of the flange. This lug or projection is shown at O in Fig. 7. This lug O gave an additional bearing upon the face of the tire and thus to a certain extent was an improvement on the Steel shoe, as it tended to wear down the face or tread of the tire at the base of the flange—a point not worn by the rail. The defect, however, found in practice in this shoe is that the lug O has, especially when it has become tempered and hardened by alternate heating and cooling as the brakes are applied and released, which, owing to the small size of the lug, very quickly happens, a tendency to cut into and make a depression or groove in the tread or face of the tire where it engages the same, as is shown by dotted lines at N in Fig. 7; but the principal defect of both of these types of shoes is that there is no provision for equalizing the wear of the shoe and the rail upon the face or tread of the tire, it being assumed in both of them that the wear of the shoe on those parts of the tire not engaged by the rail will exactly balance or equal the wear of the rail on that part of the tire engaged by it without any regard to the conditions of use. This assumption has in practice been proved to be false, and it has been found, especially in suburban or way service and on electric roads running through densely-populated districts, where very frequent stops are made, involving a frequent use of the brakes, that the invariable tendency of such a shoe is to wear away the tire at these places engaged by the shoe, as shown at $R'$ $R^2$ in Fig. 6, and to form ridges or projections on the same at the points S' S², Fig. 6, and also a gradual but continuous elevation of all of that portion of the tire engaged by the rail and not engaged by the shoe, giving the face of the tire an irregular outline, as shown in Fig. 6 by the irregular line R' S' Z S² R², the parts marked R' R² being those parts worn down by the shoe, the part marked Z being that most worn by the convex rail, and those marked S' S² being those least worn by the rail. I have devised a shoe that will obviate these defects and will act both as a brake-shoe and as a tire-truing device—that is, a shoe the wear of which on the tire will equal or balance the wear of the rail on the tire or enable the wear of the rail to equal or balance the wear of the shoe.

I will now explain the figures.

Figure 7:
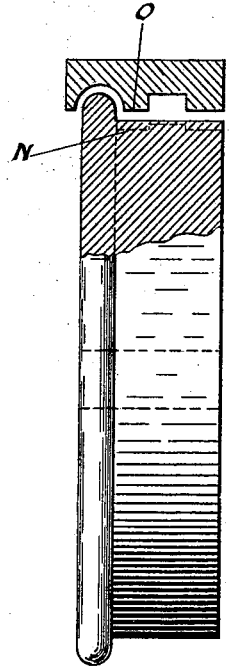
Figure 8:
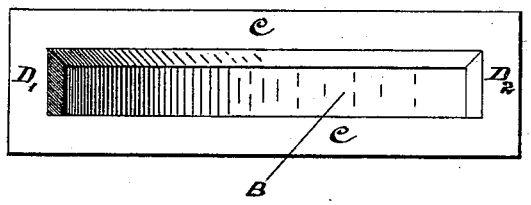

Fig. 1 is a face view of the shoe. Fig. 2 is a side view of the shoe. Fig. 3 is an end view of the shoe. Fig. 4 is a cross-section through the shoe at the line $x\,y$. Fig. 5 is a cross-section of the shoe at the line $x\,y$, showing it engaging the tire of the wheel, the dotted lines showing where the tire-dressing device will be at the end of the shoe. Fig. 6 is an end elevation of a car-wheel, showing the effect of the uneven wear of the shoe and the rail in former constructions. Fig. 7 is an end elevation of a car-wheel and a cross-section of a brake-shoe, showing in dotted lines the cutting effect of the lug O. Fig. 8 is a face view of a modified form of my shoe adapted for use with unflanged wheels.

In Fig. 1, A is a groove running lengthwise of the shoe and made to fit closely to the flange of the car wheel or tire when the brake is applied. B is a recess between the groove A and the solid face C of the shoe. C is the solid face of the shoe, which engages the outside of the face of the wheel or tire. This solid face is preferably composed of alternate soft sections $C^2$ and chilled sections $C'$, the soft sections $C^2$ projecting a little above the face of the shoe and affording a wearing-surface. D' D² are the solid ends of the shoe, which extend from the inner edge of the groove A to the outside of the shoe. These solid ends are preferably chilled. E' E² are bolt-holes adapted to receive bolts to fasten the shoe to the brake-head.

The groove A is made so as to fit closely over the flange of the wheel. The recessed portion of the shoe B is over that part of the wheel which is most worn by the rail, and the shoe having no bearing-surface on the wheel at this point the wheel is relieved from wear by the shoe.

The solid ends D' D², extending from the groove A to the outside of the shoe, engage the tire or wheel across its entire face, and being made of chilled and therefore hard iron act as tire dressing or truing devices, wearing or cutting off from the face of the tire such irregularities as are caused by the unequal wear of the rail and the brake-shoe upon the face of the wheel or tire. These end pieces D' D² are not intended to and in fact do not add greatly to the efficiency of the shoe in stopping the car, although they of course do have some breaking action, their principal office or function being as tire-dressers, and to further effect this object I may, if necessary, add another solid section in the center of the shoe corresponding to the end pieces D' D², as is shown in Fig. 1 by dotted lines D³ D⁴. This, however, is rarely found necessary, and then only where the shoe is used on cars compelled to make very frequent stops, and thus to use the brakes with great frequency.

For some purposes I make a modification of this shoe to adapt it to plain or unflanged wheels. In this case I omit the groove A, and the shoe appears as shown in Fig. 8, having the central part of the shoe recessed at B, the wearing-surfaces C C on either side of the recess, and the solid chilled end pieces D' D²; but it will be seen that this shoe is constructed on the same principle as the shoe adapted for flanged wheels and is simply modified to fit the shape of the wheel.

It will be observed that this invention is based on the fact that when the brake is frequently used the wear of those parts of the brake-shoe which engage the face of the wheel or tire is greater than the wear of the rail upon the wheel, especially as in most cases the rail has a more or less convex face, and therefore the shoe must be so constructed as to wear those portions of the wheel engaged by the rail just enough, in addition to the wear of the rail, to equal the wear of those parts of the shoe that engage those parts of the wheel that do not come in contact with the rail.

It will also be observed that this invention entirely dispenses with the lug O of the Ross shoe and its undesirable cutting action on the wheel and yet retains all the tire-dressing qualities of the Ross shoe.

I am aware that shoes having the groove A are old; also that shoes having the recessed part B extending the whole length of the shoe are old, and I do not claim such a construction.

I claim as my invention and desire to secure by Letters Patent—

A brake-shoe having the friction or wearing surface C composed of alternate, transverse, projecting, soft sections $C^2$ and depressed chilled section $C'$ and the flange wearing surface or groove A, and having the chilled cutting-surface D' D² and the remainder of its face being cut away or recessed so as in no part to contact with the tire of the wheel.

In testimony whereof I affix my signature in presence of two witnesses.

WINFIELD S. DEHART.

Witnesses:
CHARLES W. BROWER,
ALFRED B. VAN LIEW.